(12) United States Patent
Hanaki (10) Patent No.: US 6,269,439 B1
(45) Date of Patent: Jul. 31, 2001

(54) SIGNAL PROCESSOR HAVING PIPELINE PROCESSING THAT SUPRESSES THE DETERIORATION OF PROCESSING EFFICIENCY AND METHOD OF THE SAME

(75) Inventor: Hirokazu Hanaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/096,574

(22) Filed: Jun. 12, 1998

(30) Foreign Application Priority Data

Jun. 30, 1997 (JP) .................................................... 9-174407

(51) Int. Cl.$^7$ ................................ G06F 9/32; G06F 9/38
(52) U.S. Cl. ............................................. 712/235; 712/206
(58) Field of Search ................................... 712/235, 237, 712/238, 206

(56) References Cited

U.S. PATENT DOCUMENTS

| | | | |
|---|---|---|---|
| 4,200,927 | * 4/1980 | Hughes et al. | 712/235 |
| 4,439,827 | * 3/1984 | Wilkes | 712/235 |
| 4,742,451 | * 5/1988 | Bruckert et al. | 712/235 |
| 5,165,025 | * 11/1992 | Lass | 712/235 |
| 5,511,172 | * 4/1996 | Kimura et al. | 712/235 |
| 5,696,958 | * 12/1997 | Mowry et al. | 712/235 |

OTHER PUBLICATIONS

Lilja, David J., *Reducing the Branch Penalty in Pipelined Processors*, IEEE Computer, Jul. 1988, pp. 47–55.*
Gonzalez, Antonio M. et al., *Reducing Branch Delay to Zero in Pipelined Processors*, IEEE Transactions on Computers, vol. 42, No. 3, Mar. 1993, pp. 363–371.*
Hayes, John P., *Computer Architecture and Organization*, $2^{nd}$ Edition, McGraw–Hill Book Company, 1988, pp. 2–3, 592–593, and 608–614.*

* cited by examiner

*Primary Examiner*—Richard L. Ellis
(74) *Attorney, Agent, or Firm*—Ronald P. Kananen; Rader, Fishman & Grauer (57) ABSTRACT

A signal processor for pipeline processing which can effectively avoid deterioration of the processing efficiency caused by branch instructions and methods thereof: wherein when obtaining a result that an instruction decoded in an ID module is a branch instruction, determination is made as to branch existence in an EX module in the next cycle, and an instruction in a branch destination and an instruction in a non-branch destination are fetched simultaneously in an IF module; consequently, in the next cycle, in response to the result of the branch existence, one of the fetched instructions of the branch destination or the non-branch destination is selected and is then decoded in an ID module.

11 Claims, 6 Drawing Sheets

SIGNAL PROCESSOR HAVING PIPELINE PROCESSING THAT SUPRESSES THE DETERIORATION OF PROCESSING EFFICIENCY AND METHOD OF THE SAME

BACKGROUND OF THE INVENTION

1. Field of the Invention

The present invention relates to a signal processor having a pipeline circuit and a method thereof.

2. Description of the Related Art

A reduced instruction set computer (RISC) processor mounted in a digital signal processor (DSP), etc. generally performs signal processing in accordance with programs, as explained below. Namely, a processor performs signal processing for each instruction in programs by successively carrying out the following instruction stages (steps): an instruction fetch stage (IF stage) for fetching instructions from an instruction memory, an instruction decoding stage (ID stage) for decoding the fetched instructions, an execution stage (EX stage) for executing the decoded instructions, a memory access stage (MEM stage) for accessing a memory, and a write stage (WB stage) for writing results obtained by the access in the memory.

In this case, when adjusting the timing for fetching instructions to the timing after the end of the WB stage for the previous instruction, a time of double the total time spent for each of the IF stage, the ID stage, the EX stage, the MEM stage, and the WB stage is required from the time of start of fetching the previous instruction to the time of the end of the WB stage for the next instruction.

Figure 1:
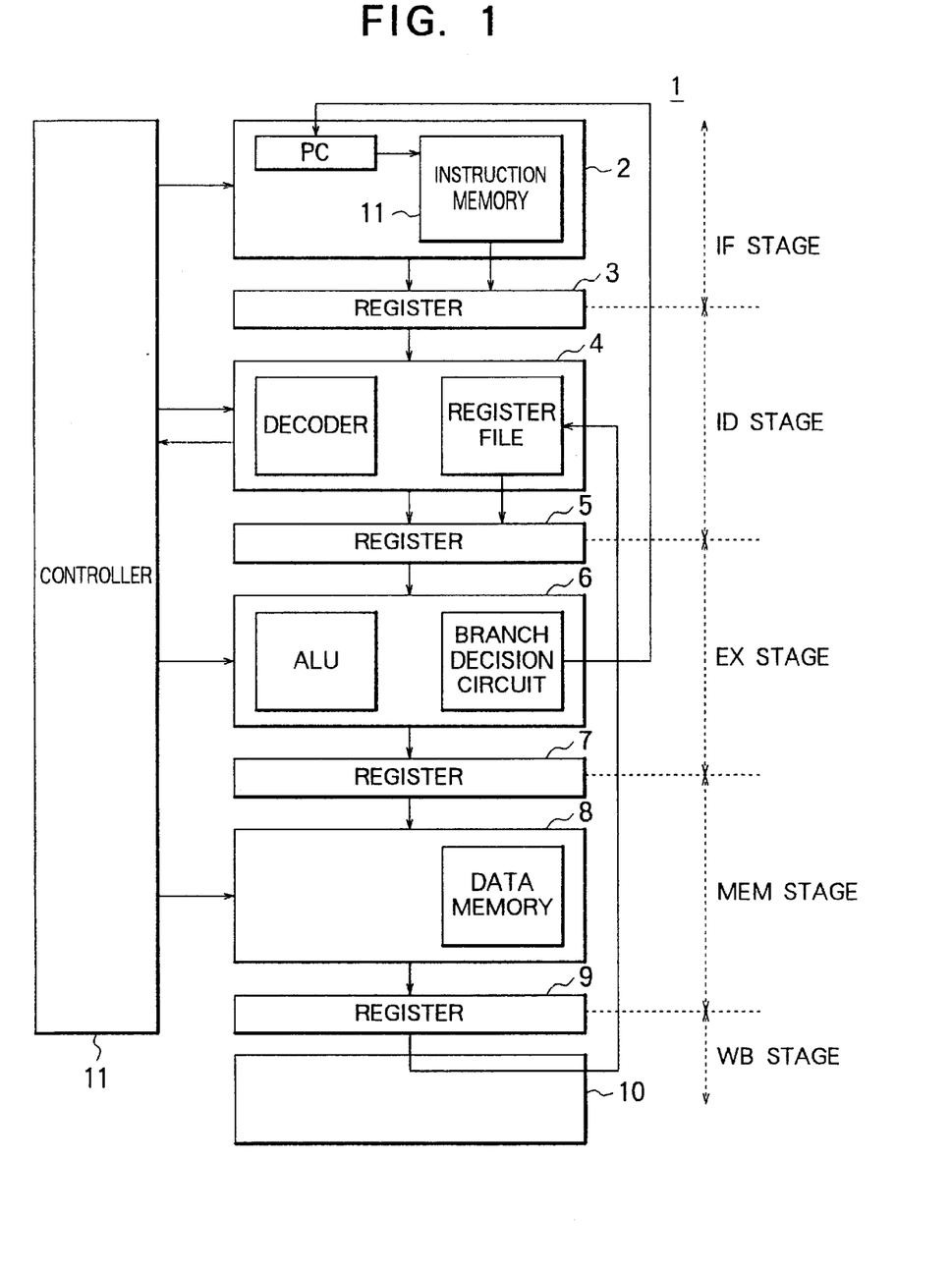
FIG. 1 is a block diagram of a processor of the related art.

FIG. 1 is a block diagram of a computer processor 1 of the related art.

As shown in FIG. 1, the processor 1 comprises an IF module 2, a register 3, an ID module 4, a register 5, an EX module 6, a register 7, an MEM module 8, a register 9, a WB module 10, and a controller 11.

The IF module 2, the ID module 4, the EX module 6, the MEM module 8, and the WB module 10 respectively execute the IF stage, the ID stage, the EX stage, the MEM stage, and the WB stage.

Here, in the processor 1, in order to increase the amount of processing per unit time, pipeline processing which performs above-mentioned processing for the different stages in parallel has been conventionally adopted.

Figure 2:
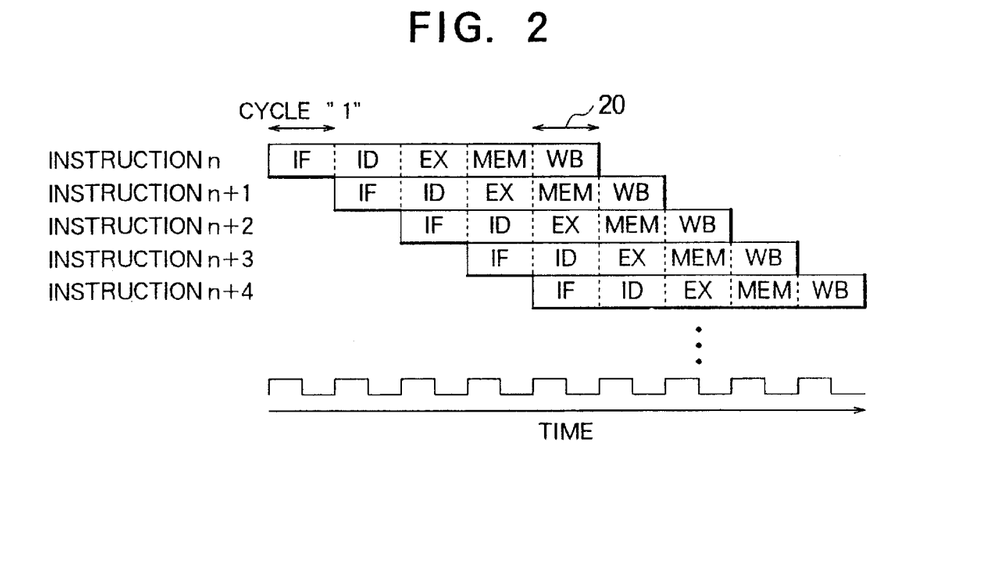
FIG. 2 is an explanatory view of pipeline processing in the processor shown in FIG. 1.

In pipeline processing, as shown in FIG. 2, processing of all of the stages is finished within one cycle, instructions are successively input to the processor for every cycle, and the different instructions of the IF stage, the ID stage, the EX stage, the MEM stage, and the WB stage are executed in parallel.

Specifically, in the processor 1 shown in FIG. 1, instructions "n" to "n+4" are input to the processor 1 at one cycle intervals. At the cycle 20, the WB stage for the instruction "n", the MEM stage for the instruction n+1, the EX stage for the instruction n+2, the ID stage for the instruction n+3 and the IF stage for the instruction n+4 are performed in parallel.

In this way, when using five-step pipeline processing, the amount of processing per cycle can be increased by five times compared with the case without pipeline processing.

While the above mentioned processor 1 was explained with reference to the example of use of five-step pipeline processing, it is also possible to further divide the processing of instructions to simplify the processing in each stage so as to raise the clock frequency and increase the amount of processing per unit time.

As explained above, in the processor 1, as shown in FIG. 2, when starting the EX stage for the instruction "n", the ID stage for the instruction n+1 and the IF stage for the instruction n+2 start.

When the instruction "n" is a branch instruction, whether the instruction "n" is a branch instruction is recognized in the ID stage. Whether or not to branch, however, that is, whether the branching condition is met or not, is decided only when the instruction "n" at the EX stage is processed. Accordingly, when the instruction "n" is determined to be a branch instruction, the instructions n+1 and n+2 which follow the instruction "n" are already fetched.

At this time, if the instructions n+1 and n+2 continue flowing into the pipeline processing, instructions for non-branch destinations (instructions placed immediately after a branch instruction) end up being executed and correct execution is not possible.

Figure 3:
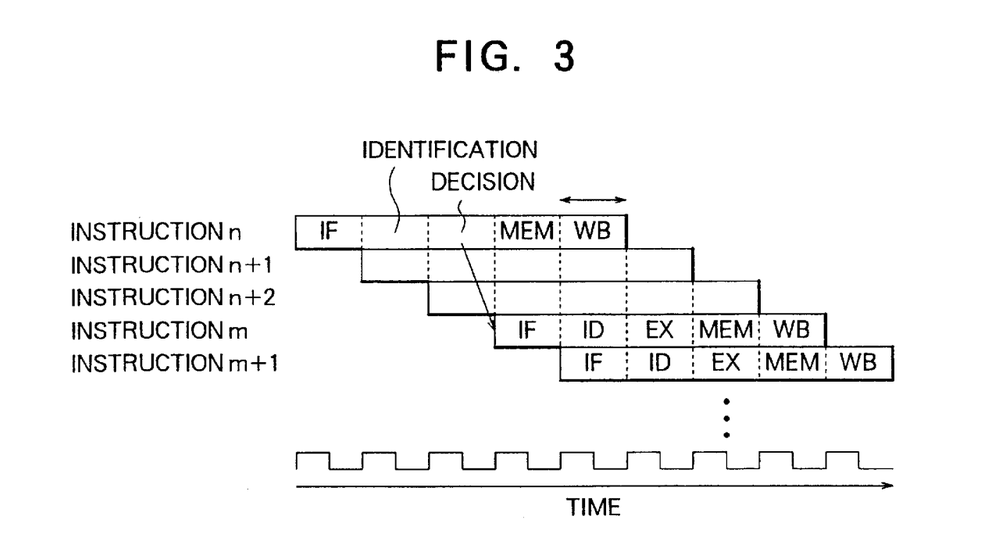
FIG. 3 is an explanatory view of processing when a branch instruction is executed in the pipeline processing of FIG. 2.

To avoid this, for example, as shown in FIG. 3, when an instruction is determined to be a branch instruction in the EX stage, the following instructions n+1 and n+2 which are already fetched are aborted and the instructions "m" and m+1 at the branch destination of the next cycle are successively fetched.

However, aborting already fetched instructions has the disadvantage of reducing the processing efficiency. For instance, in the case shown in FIG. 3, the branching results in a two-cycle delay.

In order to overcome this, use is made of the "delayed branch" technique of arranging instructions following branch instructions so that instructions which are always executed regardless of the decision of the existence of a branch instruction are positioned immediately after the branch instruction and instructions that depend on whether there is a branch instruction are delayed in execution. Here, the group of instructions which are executed regardless of a branch among instructions which follow a branch instruction is called a "delay slot".

When using the above explained delayed branch technique, if the number of instructions in a delay slot is larger than the number of instructions which could be aborted after being fetched because of a branch, it is possible to place the delay slot immediately after the branch instruction. If this is not the case, it is necessary to place a "nop" (no operation) instruction instructing the system to do nothing immediately after the branch instruction. Accordingly, there is the disadvantage that the processing efficiency declines.

There are also other methods such as stopping the pipeline when recognizing a branch instruction in the ID stage, fetching an instruction of a branch destination or non-branch destination only after the branch decision, and then restarting the pipeline.

Whichever method is used, however, it is impossible to specify the instruction to fetch next before executing the branch instruction (branch decision), therefore the pipeline is stopped until specifying which instruction to fetch and the processing efficiency declines.

Accordingly, a processor 1 using pipeline processing has a "branch penalty" caused by the branch instructions. It is important to reduce this penalty for better efficiency.

In order to reduce this branch penalty as much as possible, there is the method of predicting a branch beforehand. However, this can result in a large penalty if the prediction proves false. Also, mounting a prediction circuit has the disadvantage of increasing the size of the processor.

Another method is to make the branch decision in the ID stage and performing the branching immediately. However, if the data covered by the decision is being processed by an instruction before the branch instruction (in the EX stage), a critical path occurs and high speed mounting becomes difficult.

SUMMARY OF THE INVENTION

The present invention was made in consideration of the above related art. An object is to provide a signal processor for pipeline processing which can effectively suppress the deterioration of the processing efficiency caused by branch instructions and a method thereof.

According to a first aspect of the present invention, there is provided a signal processor comprising a means for storing instructions; a means for fetching an instruction from the instruction storing means; a means for decoding the fetched instruction; a means for executing the decoded instruction; a memory; a means for accessing the memory; a means for writing an executed result in the accessed memory; and a means for pipeline processing the operations in the instruction fetching means, the instruction decoding means, the instruction executing means, the memory accessing means, and the writing means. The instruction fetching means includes a program counter successively designating addresses in the instruction storing means, an address storage portion storing an address when the decoded instruction is a branch instruction, the address being a branch destination address included in the branch instruction, an instruction storage portion having a plurality of simultaneously accessible bank regions in which it stores instructions, a fetch portion simultaneously fetching a first instruction stored at a first address in the instruction storing means, the first address designated by the program counter, and a second instruction stored at a second address in the instruction storing means, the second address designated by an address stored in the address storage means, when the decoded instruction is a branch instruction, and a selection portion for selecting one of the simultaneously fetched first and second instructions in response to the determination of the branch condition in the branch instruction and outputting the same to the instruction decoding means.

Preferably, the instruction storage portion stores an instruction of a branch destination of a branch instruction and another instruction of a non-branch destination of the branch instruction in different bank regions.

More preferably, the instruction storage portion stores a number of successively and continuously processed instructions corresponding to the number of the bank regions in different bank regions.

Preferably, the instruction storage portion comprises a single port type memory having a single read port.

Preferably, the instruction fetching means further comprises a flag storage portion storing a flag indicating the validity of the address stored in the address storage portion and fetches the instruction stored at the address in the instruction storage portion, the address designated by the address stored in the address storage portion, only when the flag stored in the flag storage portion indicates it is valid.

Preferably, the fetch portion in the instruction fetching means specifies the bank region in response to a first section of the address and specifies the address in the bank region in response to a second section of the address.

Preferably, the instruction decoding means comprises a decoding portion for decoding the instruction selected at the selection portion and generating a control signal for executing the decoded instruction and a data storage portion storing data used in the instruction executing means.

Preferably, the instruction executing means comprises an arithmetic and logic processing portion and a branch determination portion for determining a branch condition of the branch instruction.

Preferably, the writing means stores the result of processing by the instruction executing means in the memory and the data storage portion in the instruction decoding means.

More preferably, the signal processor comprises a single instruction fetching means, a single instruction decoding means, a single instruction executing means, a single instruction accessing means, and a single writing means.

According to a second aspect of the present invention, there is provided a method of processing a signal including the steps of fetching an instruction from an instruction storing means; decoding a fetched instruction; executing the decoded instruction; accessing a memory; writing the executed result in the accessed memory, and pipeline-processing the fetching, the decoding, the executing, the accessing, and the writing, the fetching step including the steps of successively designating addresses in the instruction storing means to indicate an address of a non-branch destination instruction, storing an address when the decoded instruction is a branch instruction, the address being a branch destination address included in the branch instruction, storing an instruction of the branch destination and another instruction of the non-branch destination in different simultaneously accessible bank regions in the instruction storing means, simultaneously fetching a first instruction stored at a first address in the instruction storing means, the first address designated by the program counter, and a second instruction stored at a second address in the instruction storing means, the second address designated by the address stored in the address storage means, when the decoded instruction is a branch instruction, selecting one of the simultaneously fetched first and second instructions in response to the determination of the branch condition on the branch instruction, and decoding the selected fetched instruction.

BRIEF DESCRIPTION OF THE DRAWINGS

The above and other objects and features of the present invention will be described in more detail with reference to the accompanying drawings, in which.

DESCRIPTION OF THE PREFERRED EMBODIMENTS

Below, an explanation will be made of a processor according to an embodiment of the present invention.

Figure 4:
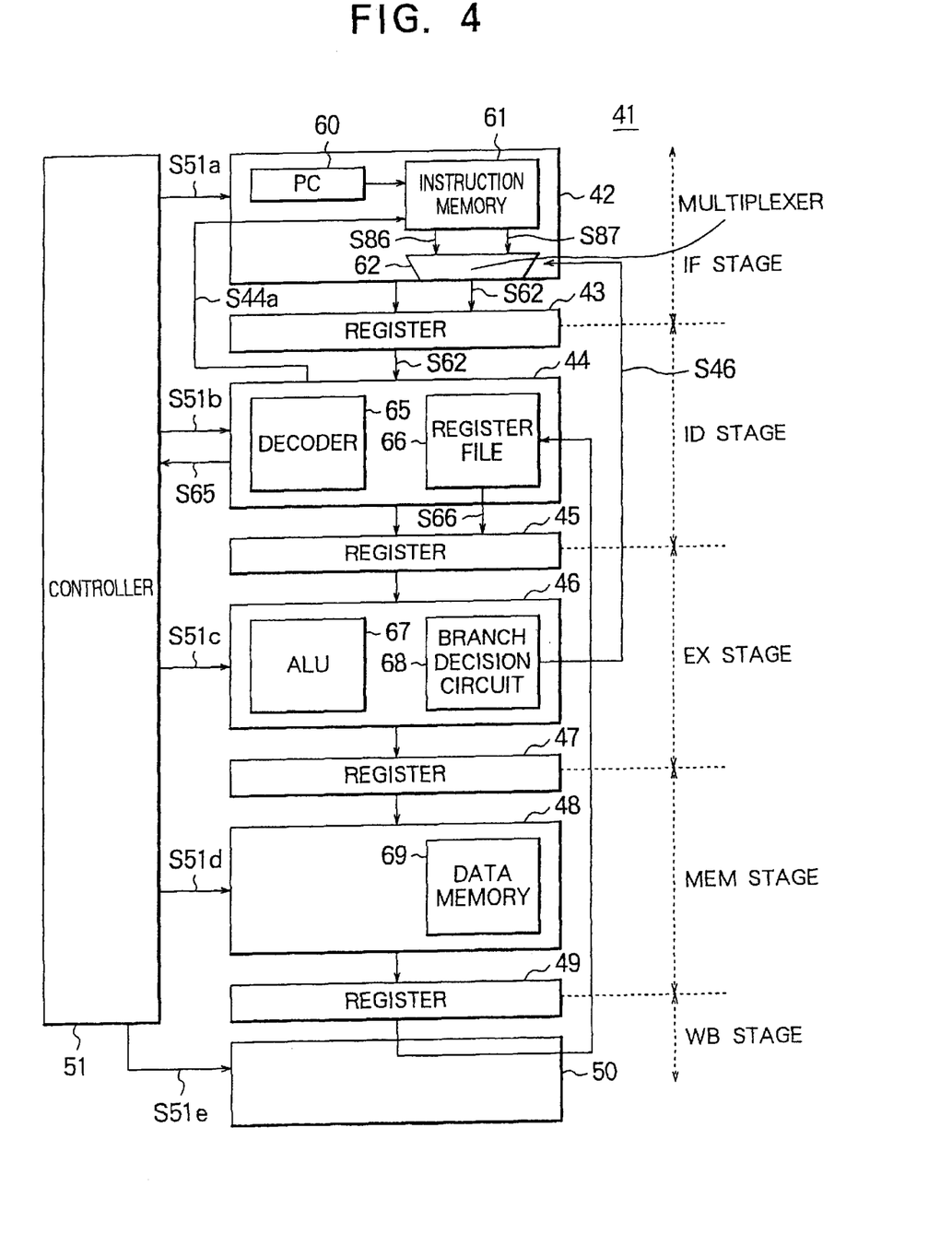
FIG. 4 is a block diagram of a processor according to an embodiment of the present invention.

FIG. 4 is a block diagram of a processor 41 of the present embodiment.

As shown in FIG. 4, a processor 41 comprises, for example, a module 42, register 43, ID module 44, register 45, EX module 46, register 47, MEM module 48, register 49, WB module 50, and controller 51.

The IF module 42, ID module 44, EX module 46, MEM module 48, and WB module 50 respectively execute an IF stage, ID stage, EX stage, MEM stage, and WB stage.

The processor 41 executes the same pipeline processing as the above processor 1, however, processes branch instructions different from the processor 1. Namely, in the same way as the processor 1 shown in FIG. 1, in the processor 41, processing of each stage is finished within one cycle, instructions are successively input to the processor at every cycle, and the IF stage, ID stage, EX stage, and MEM stage for five instructions are executed in parallel by pipeline processing.

Unlike the processor 1, however, the processor 41 decodes instructions in the ID module and when identifying an instruction as a branch instruction, decides whether there is a branch in the EX module 46 in the next cycle and simultaneously fetches instructions for the branch destination and instructions for the non-branch destination in the IF module 42. In the following cycle, one of the fetched instructions for the branch destination or the non-branch destination is selected in accordance with the result of the branch decision and the selected instruction is decoded in the ID module 44.

Below, structural elements of the processor 41 shown in FIG. 4 will be explained in detail.

First, the IF module 42 will be explained.

As shown in FIG. 4, the IF module 42 comprises, for example, a program counter 60, instruction memory 61, and multiplexer 62 serving as a selecting unit.

The program counter 60 indicates an address of an instruction to be read next in the instruction memory 61 in response to a control signal S51a from the controller 51 and successively increments the address at every cycle.

Figure 5:
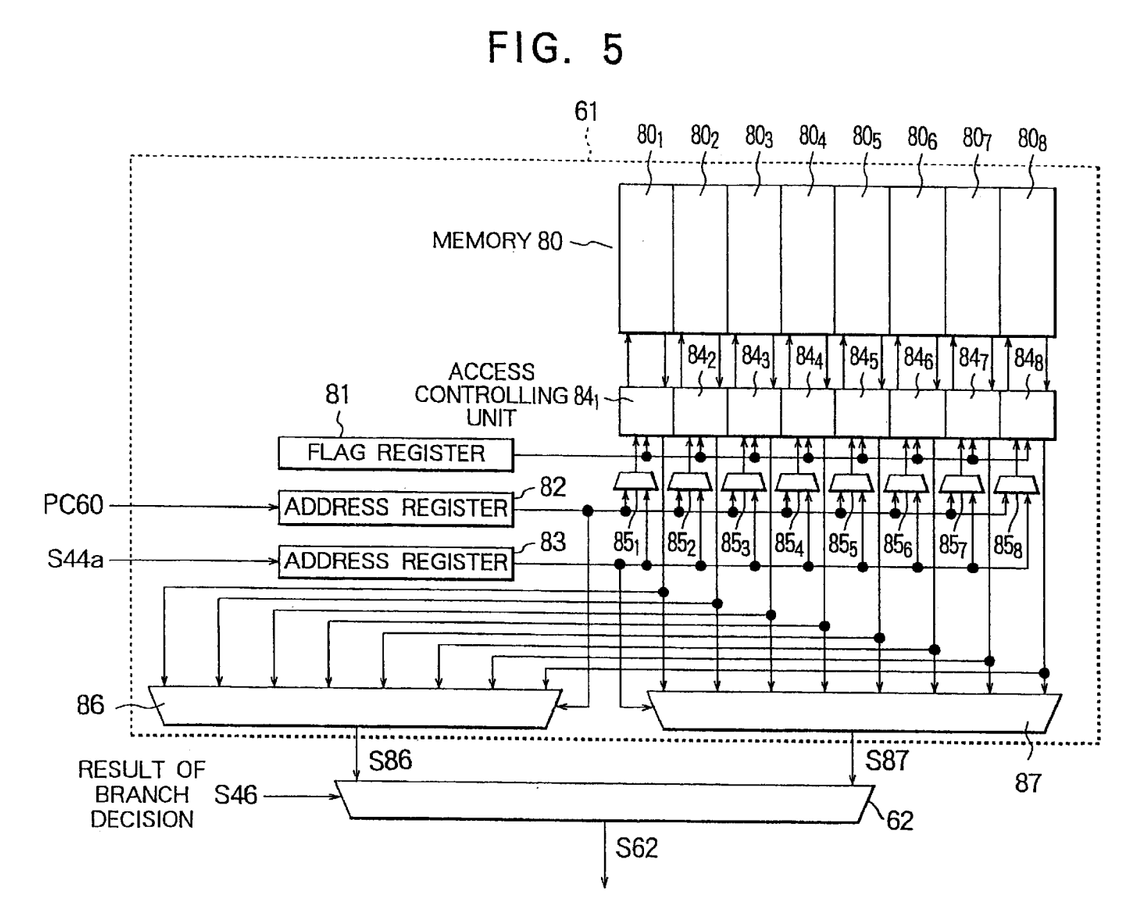
FIG. 5 is a block diagram of an instruction memory shown in FIG. 4.

FIG. 5 is a block diagram of the instruction memory 61.

As shown in FIG. 5, the instruction memory 61 comprises a memory 80 serving as an instruction memory unit, a flag register 81, address registers 82 and 83, access controlling units $84_1$ to $84_8$, and multiplexers 86 and 87.

The memory 80 is a single port memory having eight banks, for example $80_1$ to $80_8$ and can access these eight banks simultaneously. By using a single port memory as the memory 80, it is possible to reduce the size of the apparatus and lower costs.

Preferably, the number of banks of the memory 80 is set as a power of two.

Figure 6:
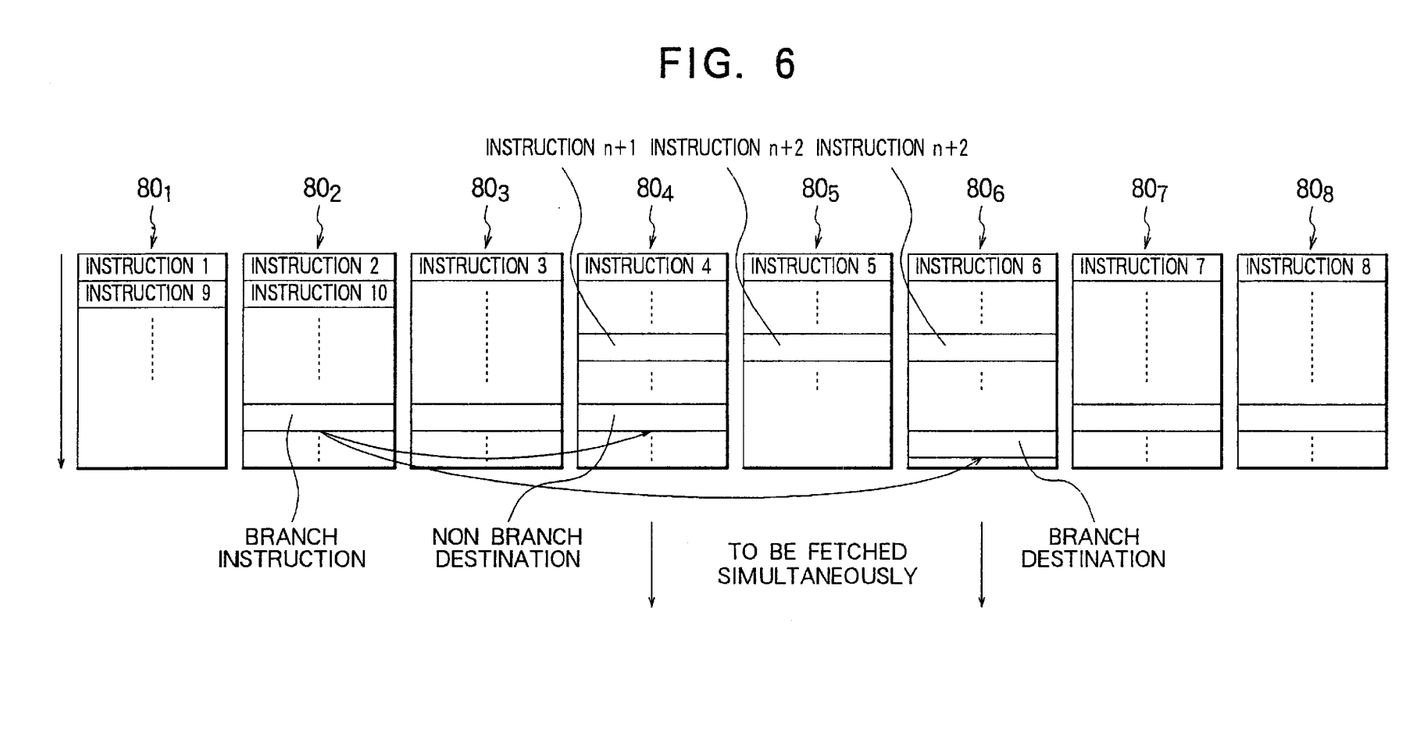
FIG. 6 is an explanatory view of a format of storage of an instruction in the memory in FIG. 5.

As shown in FIG. 6, instructions 1, 2, 3, 4, 5, 6, 7, and 8 in a program are successively stored in the banks $80_1$, $80_2$, $80_3$, $80_4$, $80_5$, $80_6$, $80_7$, and $80_8$, then instructions 9, . . . are successively stored from the bank $80_1$ toward the bank $80_8$. Accordingly, the possibility of an instruction for a branch destination and an instruction for a non-branch destination being stored in the same bank becomes one-eighth at occurrence of a branch instruction. When an instruction for a branch destination and an instruction for a non-branch destination are stored in the same bank, it is impossible to fetch these instructions simultaneously. When such a case arises, one of these instructions is replaced with another instruction without changing the semantics (meanings) of the program. If such replacement is not possible, "nop" (no operation) instructions are inserted into shift instructions so that an instruction for a branch destination and an instruction for a non-branch destination will not end up in the same bank.

As a result, at occurrence of a branch instruction, it is possible to store an instruction for a branch destination and an instruction for a non-branch destination in different banks and possible to read out these instructions simultaneously.

When the memory 80 has an 8-bank structure as explained above, for example, the lower 3 bits of the address stored in the address registers 82 and 83 indicate the bank number and the higher bits indicate the address in each bank.

The banks $80_1$ to $80_8$ are activated when the lower 3 bits of an address stored in the address register 82 or 83 are 000, 001, 010, 011, 100, 101, 110, and 111, respectively.

The address register 82 stores addresses in the memory 80 which stores instructions for non-branch destinations indicated by a program counter 60.

The address counter 83 stores addresses in the memory 80 which stores instructions for branch destination inputs from the ID module 44.

Accordingly, the IF module 42 has two address registers for accessing two of the banks of the memory 80 simultaneously.

A flag register 81 stores a flag indicating whether an address of a branch destination stored in the address register 83 is valid or not. The flag register 81 stores a flag value of 1 when storing an address of a branch destination from the ID module 44 in the address register 83, and a flag value of 0 in other cases.

Multiplexers 851 to 858 select one of the addresses of instructions for non-branch destinations stored in the address register 82 and the addresses of instructions for branch destinations stored in the address register 83, for example, in response to the control signal S51a from the controller 51 and outputs them to access the control units $84_1$ to $84_8$, respectively.

The access control units $84_1$ to $84_8$ read instructions from the banks $80_1$ to $80_8$ using higher bits respectively in response to addresses from the multiplexers $85_1$ to $85_8$ when the lower 3 bits of the addresses indicate the corresponding banks $80_1$ to $80_8$.

The access control units $84_1$ to $84_8$ do not perform a read operation for the banks $80_1$ to $80_8$ using addresses stored in the address register 83 when the flag stored in the flag register indicates value of 1.

A multiplexer 86 selects the results read from the banks $80_1$ to $80_8$ specified by the lower 3 bits of an address stored in the address register 82 among the results read from the access control units $84_1$ to $84_8$ and outputs the selected non branch destination instruction S86 to a multiplexer 62.

The multiplexer 87 selects the results read from the banks $80_1$ to $80_8$ specified by the lower 3 bits of an address stored in the address register 83 among the results read from the access control units $84_1$ to $84_8$ and outputs the selected non-branch destination instruction S87 to the multiplexer 62.

In the IF module 42, the address of the non-branch destination instruction indicated by an address stored in the address register 82 and the branch destination instruction indicated by an address stored in the address register 83 are simultaneously read out. At this time, the branch instruction is in the EX stage and a decision is being made whether or not to branch. Before the end of this decision cycle, the result of the branch decision S46 is returned from the EX module 46 to the multiplexer 62. Thus, in response to the results, one of the already simultaneously read instruction for the branch destination S86 or instruction for the non-branch destination S87 is selected at the multiplexer 62, and the processing in the IF module is ended. This selected instruction S62 is output to the ID module 44 after being latched at a register 43 shown in FIG. 4.

Next, explanation will be made of the ID module 44 shown in FIG. 4.

The ID module 44 has, as shown in FIG. 4, a decoder 65 and a register file 66.

In response to the control signal S51b, the decoder 65 decodes the instruction S62 input from the IF module 42 via a register 43, generates a variety of control signals for executing instructions, and outputs the control signal S65 to a controller 51. Simultaneously, it accesses a register file 66 and reads data to be used for processing in the EX module 46. This read data S66 is latched in a register 45 and output to the following EX module 46.

Also, when the result of decoding of the instruction S62 from the register 43 shows it is a branch instruction, the decoder 65 outputs the address of branch destination S44a to the address register 83 in the IF module 42 shown in FIG. 5 for storage and stores the flag value of 1 in the flag register 81 in the IF module 42.

As a result, in the following cycle, a branch decision is made for this branch instruction in the EX module 46. At the same time, the instruction for a branch destination and instruction for a non-branch destination are simultaneously read out in the IF module 42.

Next, an explanation will be made of the EX module 46 shown in FIG. 4.

The EX module 46 comprises an ALU (arithmetic and logic unit) 67 which executes arithmetic processing, a branch decision circuit 68, and an address generation circuit—not shown.

The ALU 67 performs signal processing using data S66 in response to the control signal S51c in accordance with a decoded result from a controller 51.

The address generation circuit generates an address in the data memory 69 which stores the data of the result of processing in the ALU 67.

Note, for arithmetic processing, the ALU 67 uses data which is stored in the data memory 69 and output to the register file 66 by accessing the register file 66.

Also, the ALU 67 stores the result of arithmetic processing in the memory 69 via the register file 66.

The EX module 46 outputs the result of arithmetic processing by the ALU 67 and address generated by the address generation circuit to the MEM module 48 via a register 47.

The branch decision circuit 68 outputs result of the branch decision S46 instructing branching to the IF module 42 when the instruction being executed in the ALU 67 is a branch instruction. At the same time, the condition for branching is evaluated and a branch decision is made. In response to the result of the branch decision S46, the IF module 42 selects either of the instruction for a branch destination or instruction for a non-branch destination, both fetched simultaneously, at the multiplexer 62 shown in FIG. 5.

Next, an explanation will be made of the MEM module 48.

The MEM module 48 has a data memory 69 and control circuit (not shown).

When receiving a write instruction, the MEM module 48, in response to the control signal S51d from the controller 51, stores (writes) data of the arithmetic processing result input from the EX module 46 to an address in the data memory 69 input from the EX memory 46 via the register 47.

When receiving a read instruction, the MEM module 48, in response to the control signal S51d from the controller 51, reads data from an address in the data memory 69 input from the EX module 46 via the register 47.

When receiving an instruction which does not require accessing of the data memory 69, the MEM module 48 outputs the data of the result of the arithmetic processing input from the EX module 46 via the register 47 to the WB module 50 via the register 49.

Furthermore, the MEM module 48 selects one of the data which is read from the data memory 69 or the data of the result of arithmetic processing from the EX module at a multiplexer in response to a control signal from the controller 51 and outputs it via the register 49 to the WB module 50.

Next, the WB module 50 will be explained.

In response to the control signal S51e, the WB module 50 stores data input from the MEM module 48 via the register 49 to the register file 66 in the ID module 44.

Below, an explanation will be made of the operation of the processor 41.

Figure 7:
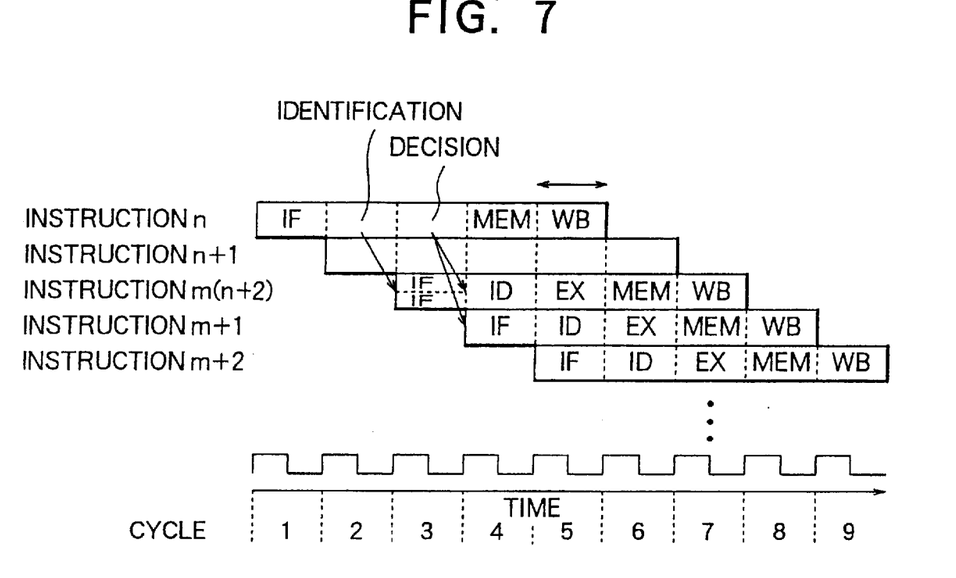
FIG. 7 is an explanatory view of processing when a branch instruction meeting the branch condition is executed by pipeline processing in a processor shown in FIG. 4.
Figure 8:
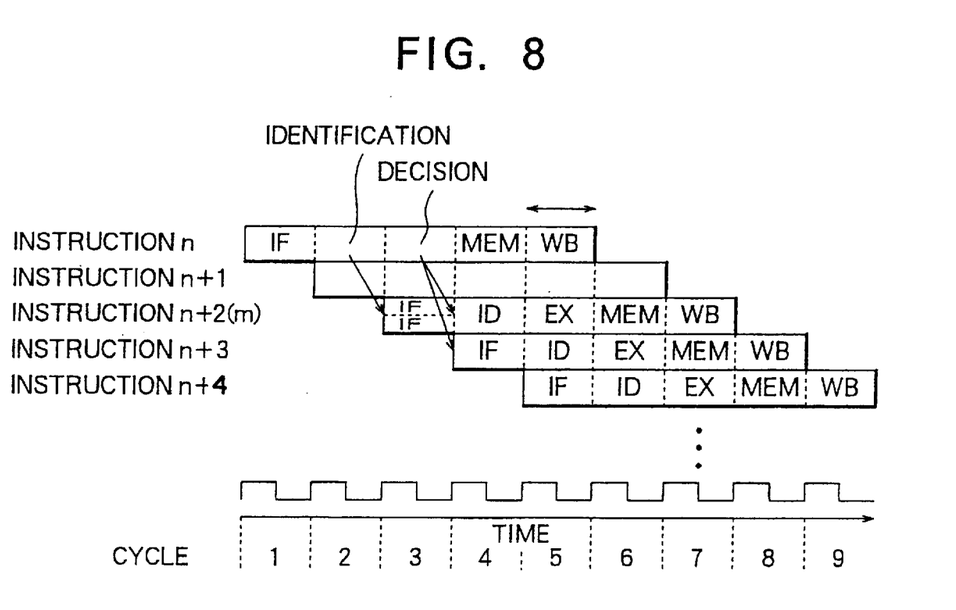
FIG. 8 is an explanatory view of processing when a branch instruction not meeting the branch condition is executed by pipeline processing in a processor shown in FIG. 4.

FIGS. 7 and 8 are an explanatory views of pipeline processing by a branch instruction at the processor 41 when a branch occurs.

First, an instruction "n" is fetched at the IF module 42 shown in FIG. 4 in the cycle "1". Then, in the next cycle "2" the instruction "n" is decoded at the ID module 44, and, simultaneously, the instruction n+1 is fetched at the IF module 42.

During this time, in the IF module 42, a flag indicating that the value of 0 is stored in the flag register 81 shown in FIG. 5, and access control units $84_1$ to $84_8$ read out instructions from the memory 80 in response to addresses indicated by the program counter 60 stored in the address register 82, and output the read instructions to the register 43 via the multiplexers 86 and 62.

Also, the instruction "n" is identified as a branch instruction at the ID module 44, the decoder 65 shown in FIG. 4 stores the flag value of 1 in the flag register 81 in the instruction memory 61 shown in FIG. 5, and the address of the instruction for the branch destination is stored in the address register 83.

Next, in the cycle "3" shown in FIGS. 7 and 8, whether the instruction "n" meets the condition for branching or not is decided at the branch decision circuit 68 in the EX module 46. When the condition is met, the result of the branch decision S46 indicating that condition is met is output to the multiplexer 62 shown in FIGS. 4 and 5.

Simultaneously, in the instruction memory 61 shown in FIG. 5, in response to the addresses stored in the address registers 82 and 83, an instruction for a branch destination m and instruction for a non-branch destination n+2 are read from the memory 80 by the access control units $84_1$ to $84_8$. Then, the instruction for a non-branch destination n+2 (S86) and instruction for a branch destination (S87) are output to the multiplexer 62, then the instruction for the branch destination "m" is selected at the multiplexer 62 in response to the result of branch decision S46 and is output as the instruction S62 to the MEM module 48 via the register 47.

In the cycle "2", the instruction n+1 which is fetched at the IF module 42 is aborted.

Next, in the cycle "4", the MEM module 48, the ID module 44, and the IF module 42 respectively execute the MEM stage for the instruction n, the ID stage for the instruction "m", and the IF stage for the instruction m+1.

Then, in the cycle "5", the WB module 50, the EX module 46, the ID module 44, and the IF module 42 respectively execute the WB stage for the instruction n, the EX stage for the instruction "m", the ID stage for the instruction m+1, and the IF stage for the instruction m+2.

Next, as long as there is no branch instruction, the IF stage, the ID stage, the EX stage, the MEM stage, and the WB stage of the instructions m+3, m+4, ... are successively executed.

FIG. 8 is an explanatory view of pipeline processing when there is no branching by a branch instruction in the processor 41.

In this case, the same processing is carried out in cycles "1" and "2" as the above-explained pipeline processing for the case wherein a branch occurs due to a branch instruction.

Then in the cycle "3", whether the instruction "n" meets the condition for branching or not is decided in branch decision circuit 68 in the EX module. When the condition is not met, the result of the branch decision S46 indicating that the condition for branching is not met is output to the multiplexer 62 as shown in FIGS. 4 and 5.

Simultaneously, in the instruction memory 61 shown in FIG. 5, in response to addresses stored in the address registers 82 and 83, the instruction for a branch destination "m" and an instruction for a non-branch destination n+2 are read from the memory 80 in the access control units $84_1$ to $84_8$. Then the instruction for the non-branch destination n+2 (S86) and the instruction for the branch destination "m" (S87) are output to the multiplexer 62, where in response to the result of the branch decision S46, the instruction for a non-branch destination n+2 is selected and output as an instruction S62 to the MEM module 48 via the register 47.

Also, the instruction n+1 fetched in the IF module 42 in the cycle "2" is aborted.

Next, in the cycle "4", the MEM module 48, the ID module 44, and the IF module 42 respectively execute the MEM stage for the instruction "n", the ID stage for the instruction n+2, and the IF stage for the instruction n+3.

Next, in the cycle "5", the WB module 50, EX module 46, ID module 44, and IF module 42 respectively execute the WB stage for the instruction "n", the EX stage for the instruction n+2, the ID stage for the instruction n+3, and the IF stage for the instruction n+4.

Afterwards, as long as there is no branch instruction, the same processing is successively carried out by the IF stage, ID stage, EX stage, MEM stage, and WB stage for the instructions n+5, n+6 . . . .

As explained above, according to the processor 41, when an instruction is identified as a branch instruction in the ID module 44, while this branch instruction is being executed and a branch decision is being made in the EX module 46 of the next cycle, both the instruction for the branch destination and the instruction for a non-branch destination are read out simultaneously and an appropriate instruction is selected as soon as the result of the branch decision S46 is obtained. As a result, regardless of the result of the branch decision S46 as to whether it is to branch or not to branch, it is possible to output an instruction for a branch or non-branch destination to the ID module 44 in the following cycle.

Therefore, compared with above mentioned parallel processor 1 of the related art, it is possible to effectively keep the processing efficiency from declining at the time of branching.

Specifically, according to the processor 41, compared with the conventional method which does not predict a branch, it is possible to shorten the processing time by the number of cycles where a branch instruction occurred.

Further, according to the processor 41, compared with the conventional method of predicting a branch occurrence, it is possible to shorten the processing time by the number of cycles where the prediction proved false.

Furthermore, according to the processor 41, compared with the conventional delayed branch method, it is possible to reduce useless clock consumption (branch penalty) when executing branch instructions by the amount of nop instructions inserted in order to keep the delay slot from being filled with other instructions.

The present invention is not limited to the above mentioned embodiment.

For example, in the embodiment, a single memory port having a single read port was applied as the memory 80 shown in FIG. 5, however, a multi-port memory having a plurality of read ports can be applied as well.

Also, in the embodiment, a structure of five-step pipeline processing was explained as shown in FIG. 4, however, the present invention is may be applied for pipeline processing of more than five steps as well.

Furthermore, the structure of the instruction memory 61 shown in FIG. 4 is not limited to the structure specially shown in FIG. 5 as far as it has the same function.

As explained above, according to the present invention, it is possible to effectively keep the efficiency of pipeline processing from declining due to branch instructions.

What is claimed is:

1. A micro processor comprising:

a means for storing instructions;

a means for fetching an instruction from the instruction storing means;

a means for decoding the fetched instruction;

a means for executing the decoded instruction to produce an executed result;

a memory;

a means for accessing the memory;

a means for writing the executed result from the accessed memory; and a means for pipeline processing the operations in the instruction fetching means, the instruction decoding means, the instruction executing means, the memory accessing means, and the writing means, the instruction fetching means including a program counter successively designating addresses in the instruction storing means, an address storage portion for exclusively storing a branch destination address included in the branch instruction, said address storage portion being separate and distinct from said program counter, an instruction storage portion having a plurality of simultaneously accessible bank regions in which instructions are stored, a fetch portion simultaneously fetching a first instruction stored at a first address in the instruction storing means, the first address designated by the program counter, and a second instruction stored at a second address in the instruction storing means, the second address designated by the address stored in the address storage portion when the decoded instruction is the branch instruction, and a selection portion for selecting one of the simultaneously fetched first and second instructions in response to the determination of the branch condition in the branch instruction and outputting said one of the simultaneously fetched first and second instructions to the instruction decoding means.

2. A micro processor according to claim 1, wherein the instruction storage portion stores an instruction of a branch destination of a branch instruction and another instruction of a non-branch destination of the branch instruction in different bank regions.

3. A micro processor according to claim 1, wherein the instruction storage portion stores a number of successively and continuously processed instructions corresponding to the number of the bank regions in different bank regions.

4. A micro processor according to claim 1, wherein the instruction storage portion comprises a single port type memory having a single read port.

5. A micro processor according to claim 1, wherein the instruction fetching means further comprises a flag storage portion storing a flag indicating the validity of the address stored in the address storage portion and fetches the instruction stored at the address in the instruction storage portion, the address designated by the address stored in the address storage portion, only when the flag stored in the flag storage portion indicates it is valid.

6. A micro processor according to claim 1, wherein the fetch portion in the instruction fetching means specifies one of the bank regions in response to a first section of the address and specifies the address in said one of the bank regions in response to a second section of the address.

7. A micro processor according to claim 1, wherein the instruction decoding means comprises a decoding portion for decoding the instruction selected at the selection portion and generating a control signal for executing the decoded instruction and a data storage portion storing data used in the instruction executing means.

8. A micro processor according to claim 1, wherein the instruction executing means comprises an arithmetic and logic processing portion and a branch determination portion for determining a branch condition of the branch instruction.

9. A micro processor according to claim 1, wherein the writing means stores the executed result within a data storage portion of the instruction decoding means.

10. A micro processor according to claim 1, wherein:

the fetched instruction is a single fetched instruction, the decoded instruction is a single decoded instruction, and the executed result is a single executed result.

11. A method of processing a signal comprising the steps of:

fetching an instruction from an instruction storing means;

decoding the fetched instruction; executing the decoded instruction to produce an executed result;

accessing a memory;

writing the executed result in the accessed memory, and pipeline-processing the fetching step, the decoding step, the executing step, the accessing step, and the writing step, the fetching step including the steps of successively designating addresses in the instruction storing means to indicate an address of a non-branch destination instruction, storing an address when the decoded instruction is a branch instruction, the address being a branch destination address included in the branch instruction, storing an instruction of the branch destination and another instruction of the non-branch destination in different simultaneously accessible bank regions in the instruction storing means, simultaneously fetching a first instruction stored at a first address in the instruction storing means, the first address designated by a program counter, and a second instruction stored at a second address in the instruction storing means, the second address designated by the address stored in an address storage means for exclusively storing a branch destination address included in the branch instruction, said address storage means being separate and distinct from said program counter, selecting one of the simultaneously fetched first and second instructions in response to the determination of the branch condition on the branch instruction, and outputting the selected fetched instruction to an instruction decode means.

* * * * *